United States Patent
Mishima et al.

[11] Patent Number: 5,954,606
[45] Date of Patent: Sep. 21, 1999

[54] POWER TRANSMISSION BELT WITH CANVAS LAYER

[75] Inventors: Kyoichi Mishima; Masashi Tamura, both of Kobe, Japan

[73] Assignee: Mitsuboshi Belting Ltd., Hyogo, Japan

[21] Appl. No.: 08/880,084

[22] Filed: Jun. 20, 1997

[30] Foreign Application Priority Data

Jun. 21, 1996 [JP] Japan .................................. 8-181563

[51] Int. Cl.[6] .............................. F16G 1/04; D06C 3/00; D06H 3/12
[52] U.S. Cl. ......................... 474/267; 474/268; 26/51.4
[58] Field of Search .................................. 474/237, 242, 474/249, 252, 260, 261, 263, 264, 265, 266, 267; 26/51.3, 51.4; 118/34

[56] References Cited

U.S. PATENT DOCUMENTS

| | | | |
|---|---|---|---|
| 4,493,681 | 1/1985 | Takano | 474/265 |
| 4,522,869 | 6/1985 | Anderson, Jr. et al. | 428/245 |
| 4,734,086 | 3/1988 | Fisher et al. | 474/263 |
| 4,737,138 | 4/1988 | Komai et al. | 474/266 |
| 4,869,711 | 9/1989 | Komai | 474/263 |
| 5,382,200 | 1/1995 | Kimoto | 474/260 |
| 5,413,538 | 5/1995 | Mishima | 474/263 |
| 5,425,681 | 6/1995 | Van Hook | 474/263 |
| 5,484,343 | 1/1996 | Nakajima et al. | 474/266 |
| 5,501,908 | 3/1996 | Shioyama et al. | 474/263 |
| 5,753,369 | 5/1998 | Kawashima et al. | 474/267 |

*Primary Examiner*—John A. Jeffery
*Assistant Examiner*—Matthew A. Kaness
*Attorney, Agent, or Firm*—Wood, Phillips, VanSanten, Clark & Mortimer

[57] ABSTRACT

A power transmission belt having a body with a length, an inside, an outside, and at least one rib on the inside of the body. A canvas layer is provided on the outside of the body. The canvas layer is a plain weave canvas made up of cotton fiber and synthetic fiber which are present in a proportion such that there is at least as much synthetic fiber as there is cotton fiber in the canvas layer. The canvas layer has warp and weft yarns, each with center lines which cross to be biased with respect to the length of the body. The canvas layer is adhered to the body without performing a tentering treatment on the canvas layer.

24 Claims, 3 Drawing Sheets

COMPARATIVE SAMPLE NO. 1

THREAD COUNT: 14/10 MM
SINGLE YARN TENSILE STRENGTH
(WARP AND WEFT): 9N/YARN
θ1= 60°

COMPARATIVE SAMPLE NO. 2

THREAD COUNT: 10/10 MM
SINGLE YARN TENSILE STRENGTH
(WARP AND WEFT): 9N/YARN

INVENTIVE CANVAS

THREAD COUNT: 10/10 MM
SINGLE YARN TENSILE STRENGTH
(WARP AND WEFT): 14N/YARN

POWER TRANSMISSION BELT WITH CANVAS LAYER

BACKGROUND OF THE INVENTION

1. Field of the Invention

This invention relates to power transmission belts and, more particularly, to a power transmission belt having a rubber body with a canvas layer adhered thereto to reinforce, and thereby avoid splitting of, the rubber.

2. Background Art

V-ribbed power transmission belts are used in a wide range of industries, including the automotive industry. The design of V-ribbed belts in the automotive industry has been dictated by a number of different requirements and objectives. The V-ribbed belts are required to operate in a compact engine compartment. It is desirable that V-ribbed belts have a substantial life in this environment. At the same time, cost is an important consideration in the design of V-ribbed belts for the automotive industry.

It is known to construct V-ribbed belts with a body having an inside, on which ribs are formed, and an outside, to which a canvas layer is adhered. The canvas layer resists vertical splitting between the inside and outside of the belt, particularly between ribs where the body is the thinnest and thus weakest, and thus becomes significant in determining the overall quality of the belt.

It is known to tenter a canvas layer before application thereof to the belt body. Typically, a plain weave canvas is used which has warp and weft yarns having central axes that are initially crossed at 90°. The tentered canvas produces an angle of 120° between the warp and weft yarns in a lengthwise direction of the belt, as identified by θ in FIG. 2 herein.

The above tentered canvas is made from a plain weave canvas made up of 100% cotton fiber, with the thread count of both the warp and weft yarns being 10/10 mm. Each single yarn has a tensile strength of at least 9 N/yarn (N (Newton), is a tensile strength unit, with 1 kgf=9.8N and 1N=0.102 kgf). After tentering, the thread count of both the warp and weft is at least 14/10 mm.

The tentering process requires processing equipment that has a substantial cost. Further, tentering requires an additional manufacturing step, thereby increasing time and expense associated with the manufacture of V-ribbed belts with which the canvas is associated.

The advantage of tentering is simply demonstrated. A plain weave canvas made of spun yarn made of 100% cotton fiber was applied to a V-ribbed belt without tentenrng. The canvas had a yarn count of at least 10/10 mm, with each single yarn having a tensile strength of approximately 9N/yarn. Foreign matter, such as rubber viscous material, stones, and the like, were planted in the grooves between adjacent ribs. Inadequate resistance to vertical splitting of the belt was noticed.

The widthwise static tensile strength of the above canvas layer, after tentering, was approximately 650N/30 mm. The tensile strength of the above plain weave canvas layer, woven under exactly the same conditions without tentering, was 380N/30 mm.

For an untentered cotton fiber plain weave canvas layer to have the same widthwise tensile strength as the tentered canvas of the same composition, in the absence of tentering, the thread count in the belt must be increased to 1.7 times or the single yarn tensile strength must be increased to 1.7 times.

Increasing the thread count by a factor of 1.7 reduces bending resistance for the belt and increases the cost of the canvas and thus the belt made therewith. Increase in the single yarn tensile strength results in an increase in the diameter of the single yarn, which decreases the bending resistance and increases the thickness of the belt in which the canvas layer is incorporated. Increasing belt size is contrary to the aforementioned objective of minimizing belt size as for use in automobile engine compartments.

SUMMARY OF THE INVENTION

In one form, a power transmission belt is provided having a body with a length, an inside, an outside, and at least one rib on the inside of the body. A canvas layer is provided on the outside of the body. The canvas layer is a plain weave canvas made up of cotton fiber and synthetic fiber which are present in a proportion such that there is at least as much synthetic fiber as there is cotton fiber in the canvas layer. The canvas layer has warp and weft yarns, each with center lines which cross to be biased with respect to the length of the body. The canvas layer is adhered to the body without performing a tentering treatment on the canvas layer.

In one form, the power transmission belt is a V-ribbed belt with a plurality of ribs formed on the inside of the belt body.

The warp and weft yarns may be present in amount of at least 10/10 mm.

The warp and weft yarns may have a tensile strength of at least 14N/yarn.

In one form, the warp and weft yarns are at least one of a) a yarn made up of cotton and synthetic fibers, b) a twisted yarn made up of cotton and synthetic fibers, and c) a yarn fabric made up of at least one of i) yarn that is made of cotton and synthetic fibers and ii) a twisted yarn made up of cotton and synthetic fibers.

The synthetic fiber may be at least one of a) a polyester that is at least one of polyethylene terephthalate and polyethylene naphthalate, b) nylon, c) aramid, and d) vinylon.

The canvas layer may be made of only the cotton fibers and the synthetic fibers.

Load carrying cords may be embedded in the body and extend lengthwise thereof.

The center lines of the warp and weft yarns may cross at an angle of 90±10°.

The invention also contemplates a power transmission belt having a body with a length, an inside, an outside, and at least one rib on the inside of the body. A canvas layer is provided on the outside, which canvas layer is a plain weave canvas made of cotton fiber and synthetic fiber. The canvas layer is adhered to the body without performing a tentering treatment on the canvas layer.

Still further, the invention contemplates a power transmission belt having a body with a length, an inside, an outside, and at least one rib on the inside of the body. A canvas layer is provided on the outside of the body. The canvas layer is a plain weave canvas made of warp and weft yarns. The canvas layer is adhered to the body without performing a tentering treatment on the canvas layer.

According to the invention, the tentering treatment can be avoided while providing a canvas layer exhibiting characteristics typical of a tentered canvas layer. It is possible to construct a belt using relatively inexpensive cotton fiber without tentering that exhibits good strength and resistance to vertical splitting. The invention makes it possible to construct a relatively thin belt at a reasonable cost without a significant sacrifice in terms of belt life. That is, a belt can be constructed that meets the various demands noted above for V-ribbed belts in the various environments in which they are used.

DETAILED DESCRIPTION OF THE DRAWINGS

Figure 1:
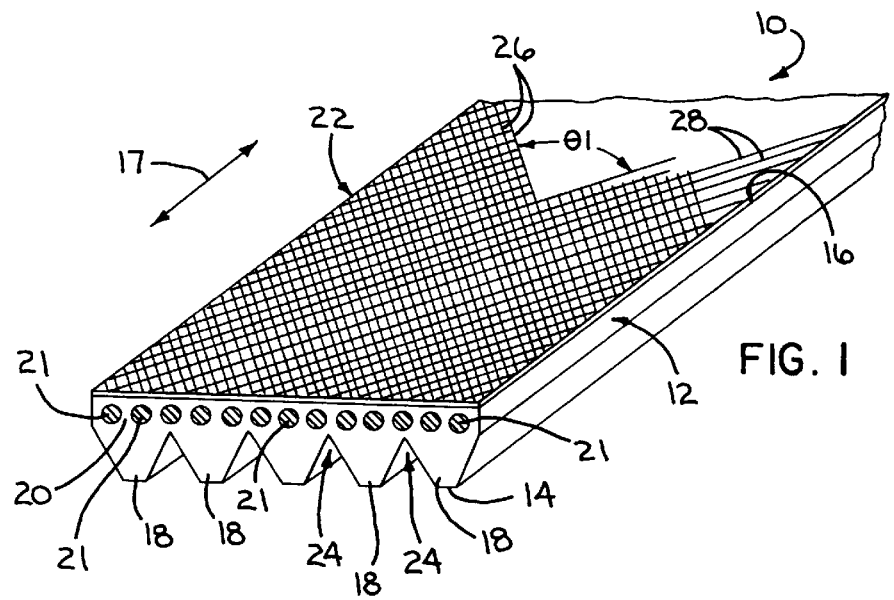
FIG. 1 is a fragmentary, perspective view of a V-ribbed belt with a canvas layer, according to the present invention, incorporated therein.

In FIG. 1, a V-ribbed belt, according to the present invention, is shown at 10. The belt 10 has a body 12 with an inside surface 14 and an outside surface 16. The body 12 has a length as indicated by the double-headed arrow 17. A plurality of, and in this case five, ribs 18 are formed on the inside of the belt body 12. A cushion rubber layer 20, outside of the ribs 18, has embedded therein a plurality of load carrying cords 21, which extend in a lengthwise direction. A canvas layer 22, according to the present invention, is adhered to the outside surface 16 of the belt body 12. Foreign matter, such as rubber viscous material, stones, and other particulate material, migrates to within the grooves 24 between adjacent ribs 18 in normal operations. A pulley, which cooperates with the belt 10, exerts an outward pressure on the material and thereby tends to split the belt body 12 at the location between the ribs 18. This condition may cause a significant decrease in the belt life. The canvas layer 22 adhered to the body 12 avoids the tendency of the belt body 12 to split and generally enhances the durability and life of the belt 10.

Figure 4:
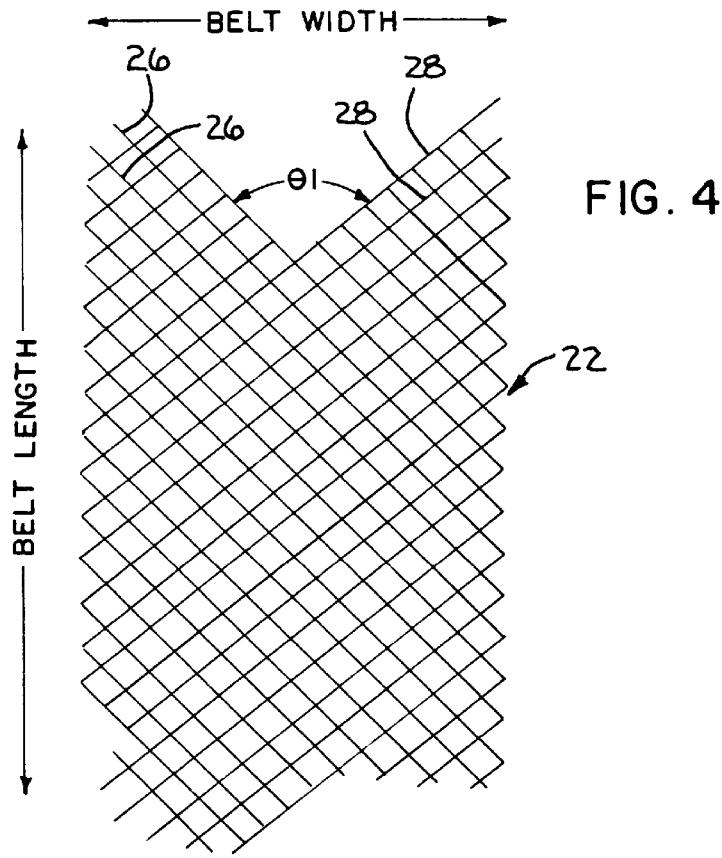
FIG. 4 is a view as in FIGS. 2 and 3 showing a canvas layer made of 50% cotton fiber and 50% synthetic fiber, according to the present invention.

The canvas layer 22 is made up of woven warp yarns 26 and weft yarns 28 with center lines that cross each other at an angle θ1 (FIG. 4). The yarns 26, 28 are a mixture of cotton fiber and a synthetic fiber which are woven into a plain weave fabric. The synthetic fibers in the yarns 26, 28 are present in an amount equal to or greater than the amount of cotton fibers.

The synthetic fibers may be a polyester, such as polyethylene, terephthalate (Pet) or polyethylene naphthalate (Pen), nylon, aramid, or vinylon. The yarns 26, 28 may be a mixture of cotton fiber and synthetic fiber, twisted cotton and synthetic fibers, or a fabric combining these two yarns.

The yarn count is at least 10/10 mm, with the single yarn tensile strength being at least 14N/yarn.

It has been found that with the synthetic fiber being present in a greater proportion than the cotton fiber, the single yarn tensile strength is adequate, and the resistance to vertical splitting in the belt body 12 is excellent. However, this leads to an increase in cost when compared to yarns made from cotton. When the synthetic fiber is present in a lesser proportion than the cotton fibers, the widthwise tensile strength of the canvas layer 22 may be inadequate. To offset this problem, the single yarn tensile strength and/or a thread count per unit length of the belt would have to be increased, with the result being that the bending properties in the circumferential direction are compromised. The cost of the belt also increases.

Contrary to common belief that the plain weave canvas of the conventional V-ribbed belt must be forcibly tentered to provide adequate resistance to vertical splitting of the belt body, as demonstrated below, the present invention has been able to approximate the same resistance to vertical splitting of a plain weave tentered canvas made from 100% cotton fiber yarn, without the burden and cost of the tentering treatment of the plain weave canvas. Belts with the inventive canvas incorporated therein may also exhibit good resistance to fatigue from bending. As further described below, the inventive canvas layer will perform better in terms of resistance to vertical split and bending resistance than an untentered, plain weave canvas formed from 100% cotton fiber.

TESTING

Testing was undertaken using three types of canvas: 1) a conventional, plain weave canvas in comparative sample No. 1 made from 100% cotton fiber which was tentered; 2) a conventional plain weave canvas in comparative sample No. 2 made from 100% cotton fiber which was not tentered; and 3) the inventive, untentered canvas made with cotton fiber and a synthetic fiber, with the synthetic and cotton fibers present in a proportion such that there is at least as much synthetic fiber as cotton fiber.

The yarn count in the comparative sample No. 1 was 14/10 mm and 10/10 mm for each of the comparative sample No. 2 and the inventive canvas. The single yarn tensile strength was 9N/yarn for each of comparative sample Nos. 1 and 2 and 14N/yarn for the inventive canvas. All samples were a plain weave canvas.

Figure 2:
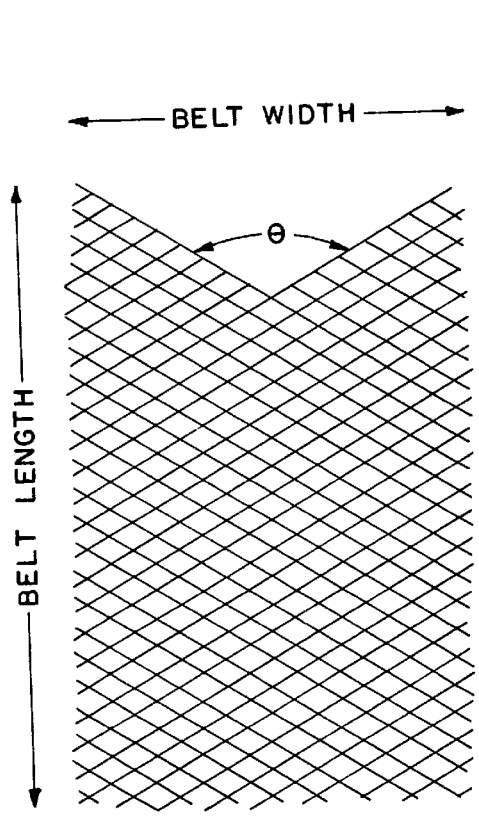
FIG. 2 is a plan view of a part of a conventional canvas layer made by tentering a plain weave canvas made of 100% cotton fiber.
Figure 3:
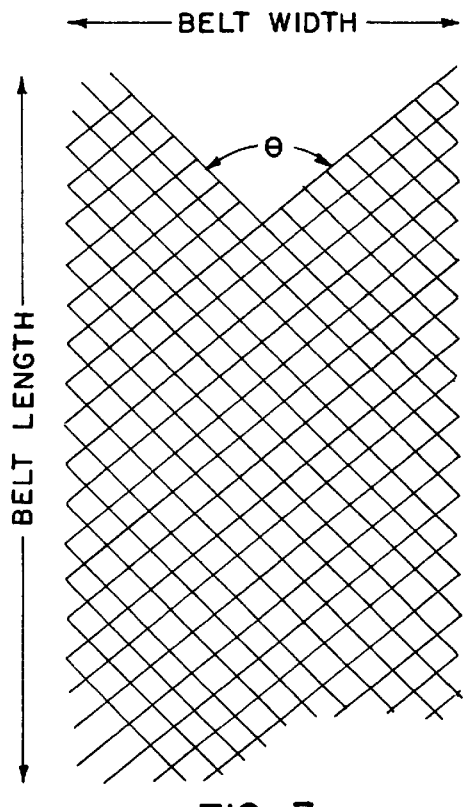
FIG. 3 is a view as in FIG. 2 before tentering occurs.

Comparative sample No. 1 was a plain weave canvas formed of 100% cotton fiber which is tentered, with the yarns crossing at an angle of 120°, as shown in FIG. 2. Comparative sample No. 2 was a plain weave canvas formed from 100% cotton fiber which was not tentered, as shown in FIG. 3. The inventive canvas was a plain weave canvas which was formed of 50% cotton fiber and 50% polyethylene terephthalate (Pet), which was not tentered, as shown in FIG. 4.

Figure 5:
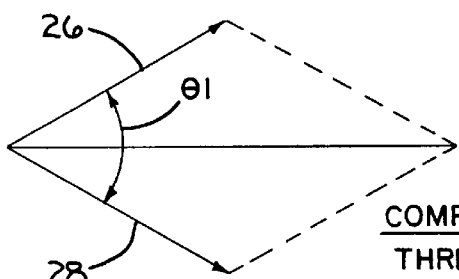
FIG. 5 is a schematic representation showing widthwise static tensile strength for the canvas layer as shown in FIG. 2.
Figure 6:
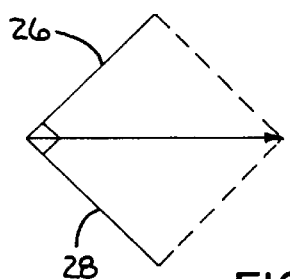
FIG. 6 is a view as in FIG. 5 for the canvas layer shown in FIG. 3.
Figure 7:
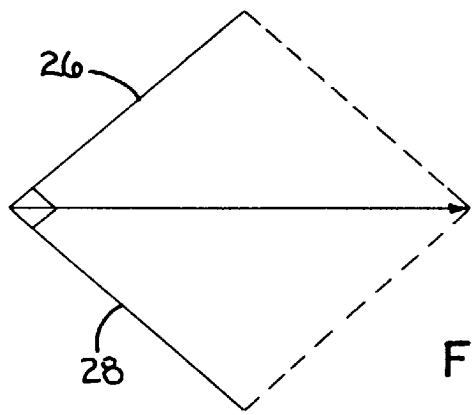
FIG. 7 is a view as in FIGS. 5 and 6 for the canvas layer as shown in FIG. 4.

The static widthwise tensile strength of the canvas layers in FIGS. 2–4 was calculated as shown in FIGS. 5–7, consecutively. In FIG. 5, a static tensile strength along a bisecting line between the warp 26 and weft 28 was calculated. In the comparative sample No. 1, the thread count was 14/10 mm, with the single yarn tensile strength of the warp and weft yarns being 9N/yarn. Thus, the tensile strength for 10 mm of the warp and weft was 126N and the widthwise tensile strength was 218 N/10 mm, according to the following equation:

$$126 \times \frac{\sqrt{3}}{2} \times 2, \text{ or } 126 \times \sqrt{3}$$

Thus, for a canvas width of 30 mm, the tensile strength was 654 N/30 mm.

A similar calculation was made for the static tensile strength for the canvas layer in comparative sample No. 2 in FIG. 6. The thread count in the canvas was 10/10 mm, with a single yarn tensile strength of the warp and weft being 9 N/yarn. Thus, the tensile strength for 10 mm of warp and weft was 90N, with the widthwise tensile strength being 127 N/10 mm, as calculate below:

$$90 \times \frac{1}{\sqrt{2}} \times 2, \text{ or } 90 \times \sqrt{2}$$

Thus, for a canvas width of 30 mm, the tensile strength was 381 N/30 mm.

A similar calculation was carried out for the inventive canvas layer in FIG. 4. The thread count was 10/10 mm, with the single yarn tensile strength of the warp and weft being 14N/yarn. Thus, the tensile strength per 10 mm of the warp and weft was 140N, with the widthwise tensile strength being 198N/10 mm according to the following equation.

$$140 \times \frac{1}{\sqrt{2}} \times 2, \text{ or } 140 \times \sqrt{2}$$

Thus, for a canvas layer width of 30 mm, the tensile strength was 594 N/30 mm.

The static tensile strength of the tentered canvas in comparative sample No. 1 was approximately 650 N/30 mm while that of the untentered plain weave canvas made of 100% cotton fiber in comparative sample No. 2 was approximately 380 N/30 mm. In order to provide approximately the same tensile strength of the canvas in comparative sample No. 1 to the canvas in comparative sample No. 2, in the case of a single yarn tensile strength of 9N/yarn, the thread count of the canvas would have to be increased to 1.7 times or the single yarn tensile strength would have to be increased to 1.7 times. The former would result in a reduction in the bending resistance, with an attendant increase in the cost. The latter would result in an increase in the yarn diameter, decrease in bending resistance, and increase in the thickness of the belt into which the canvas layer is incorporated.

With the inventive canvas, as described above, the yarn count is a relatively small value of 10/10 mm, with the resistance to vertical split being approximately the same as that of the tentered canvas in comparative sample No. 1. The static tensile strength in the widthwise direction of the canvas layer, which resists splitting, is 654 N/30 mm in comparative sample No. 1 and 594 N/30 mm for the inventive canvas. Thus, the tensile strength for the inventive canvas is only 10% less than that for the comparative sample No. 1.

The thread count for the belt for comparative sample No. 1 was 14/10 mm, with the thread count for the inventive canvas being 10/10 mm. Although the thread count per unit length for the inventive canvas is less than for the comparative sample No. 1 by 4, no significant difference in the static tensile strength in the widthwise direction of the canvas resulted. By reducing the yarn count per 10 mm by 4, the density of the weaving yarn is reduced in the inventive canvas, leading to a decrease in the cost of the final belt product.

Comparing the comparative sample No. 2 with that of the inventive canvas, the static tensile strength is improved by approximately 1.6 times for the inventive canvas.

A bending resistance test for statically evaluating the resistance to fatigue from bending of the above three canvas layers was conducted on the basis of JIS R3420. Five canvas test pieces having a length of 110 mm, a width of 15.0±0.5 mm, and a thickness of less than 2.6 mm were prepared. The test pieces were fixed by exerting a load on upper ends of the test pieces using an MIT bending resistance tester. The lower ends of the test pieces were fixed on a swing element which was repeatedly swung horizontally within the range of 135±5°. The measurement was conducted using a bending speed of 175 times per minute, and a bending angle of 60°, under a tension of 9.8 N (1 kgf). The average value of the number of bendings of the five canvas test pieces is represented by the value rounded to the nearest whole number. The results are shown in Table 1, below.

TABLE 1

|  | Number of bendings at break (number/15 mm) |
| --- | --- |
| Comparative Sample No. 1: 100% Cotton Fiber Tentered Canvas | 9,000 |
| Comparative Sample No. 2: 100% Cotton Fiber Plain Weave Canvas | 4,000 |
| Inventive Canvas: 50% Cotton Fiber/50% Pet Fiber Plain Weave Canvas | 30,000 |

From the above, it can be seen that the resistance to fatigue from bending using the inventive canvas was at least three times as high as that for the comparative sample No. 1 and at least approximately seven times as high as that for the comparative sample No. 2.

Dynamic evaluation of the resistance to vertical split with foreign matter, such as rubber viscous material, stones, and the like, present was undertaken. The foreign matter was located in the grooves between adjacent ribs on belts to which each of the above three canvases was adhered. The tip radius and pitch of the ribs in a V-ribbed pulley around which the belts were trained were equal to those for an ordinary V-ribbed pulley. In this case, a back height of one V-rib was set at 4.2 mm, which is slightly larger, while the back height of other ribs was 3.45 mm. A substitute test was conducted with a stepped V-ribbed pulley in which a state with foreign matter between ribs was assumed using the ribs having a larger back height.

Figure 8:
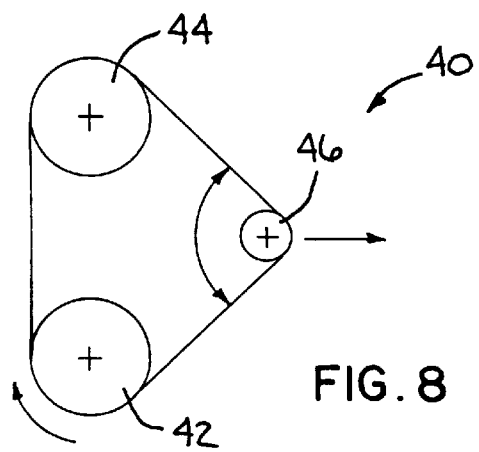
FIG. 8 is a schematic representation of a system for testing durability of a belt using a stepped pulley.

A dynamic test setup using a stepped pulley is shown at 40 in FIG. 8. The above-mentioned V-ribbed belts, having a 5 PK1100 configuration, were trained around a stepped drive pulley 42 having a 120 mm diameter, a stepped driven pulley 44 having a 120 mm diameter, and a stepped tensioning pulley 46 having a diameter of approximately 45 mm. The tensioning pulley 46 was adjusted so that at room temperature, with a load of 12 PS on the driven pulley, the tension on each belt was 90 kgf/5 ribs. The driven pulley 44 was operated at 4900 rpm. The durability of each belt was measured.

The results of the durability test are shown in Table 2, below.

TABLE 2

| | Travelling time, Occurrence of Trouble |
|---|---|
| Comparative Sample No. 1: 100% Cotton Fiber Tentered Canvas | 350 hrs., no abnormality |
| Comparative Sample No. 2: 100% Cotton Fiber Plain Weave Canvas | 120 hrs., occurrence of vertical split |
| Inventive Canvas: 50% Cotton Fiber/50% Pet Fiber Plain Weave Canvas | 370 hrs., no abnormality |

From Table 2, it can be seen that the V-ribbed belt using the inventive canvas layer maintained approximately the same resistance to vertical splitting as the V-ribbed belt in comparative sample No. 1 having the tentered canvas, even though the thread count for the canvas in the inventive belt was minimized.

At the same time, since the yarn count of the belt was set at 10/10 mm, the density of the warp and the weft in the belt was equal to that in the conventional cotton fiber plain weave canvas. The resistance to fatigue from bending in the circumferential direction of the belt was not impaired.

Figure 9:
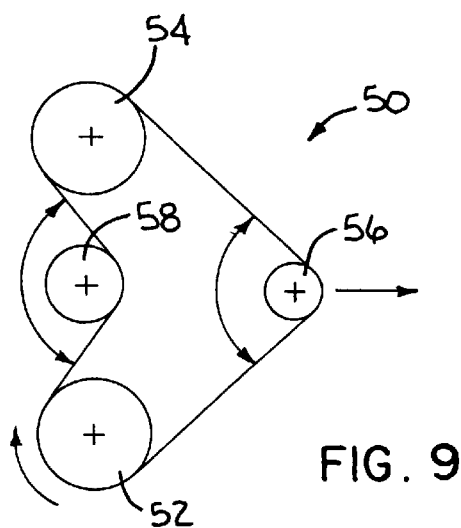
FIG. 9 is a schematic representation of a system for testing durability of a belt by inverse bending under low tension using four pulleys/shafts.

A separate test was performed using each of the above three canvas layers on a dynamic setup is shown at 50 in FIG. 9. Through this system, durability was tested using a four shaft inverse bending arrangement in a high temperature environment under low tension. A V-ribbed belt having a 3PK1100 construction was trained around a driving pulley 52 having a 120 mm diameter, a driven pulley 54 having a 120 mm diameter, and a tensioning pulley 56 having a diameter of approximately 45 mm. The belts were pressed on the backside between the driving pulley 52 and the driven pulley 54 by means of an idler pulley 58 having a diameter of 85 mm, with the system being at an atmospheric temperature of 85° C. The tensioning pulley 56 was fixed so that the load on the driven pulley 54 was 12 PS and the tension of the belt was 57 kgf/3 ribs. The driven pulley was operated at 4900 rpm, with the durability of each belt then measured.

The results of the testing on the system 50 are shown in Table 3 below.

TABLE 3

| | Travelling Time, Occurrence of Trouble |
|---|---|
| Comparative Sample No. 1: 100% Cotton Fiber Tentered Canvas | 380 hrs., rib split |
| Comparative Sample No. 2: 100% Cotton Fiber Plain Weave Canvas | 300 hrs., rib split |
| Inventive Canvas: 50% Cotton Fiber/50% Pet Fiber Plain Weave Canvas | 400 hrs., rib split |

From Table 3, it can be seen that the belt with the inventive canvas was superior in durability to the V-ribbed belt in comparative sample No. 1.

The foregoing disclosure of specific embodiments is intended to be illustrative of the broad concepts comprehended by the invention.

We claim:

1. A power transmission belt comprising:
   a body having a length, an inside surface, an outside surface, and at least one rib on the inside surface of the body; and
   an untentered canvas layer on the outside surface of the body,
   said canvas layer comprising a plain weave canvas comprising cotton fiber and synthetic fiber which are present in a proportion such that there is at least as much synthetic fiber as there is cotton fiber in the canvas layer,
   said canvas layer comprising warp and weft yarns each with center lines which cross to be biased with respect to the length of the body.

2. The power transmission belt according to claim 1 wherein the power transmission belt is a V-ribbed belt with there being a plurality of ribs formed on the inside surface of the belt body.

3. The power transmission belt according to claim 2 wherein the warp and weft yarns are present in an amount of at least 10/10 mm.

4. The power transmission belt according to claim 3 wherein the warp and weft yarns each have a tensile strength of at least 14 N/yarn.

5. The power transmission belt according to claim 2 wherein the warp and weft yarns comprise at least one of a) a yarn comprising cotton and synthetic fibers, b) a twisted yarn comprising cotton and synthetic fibers, and c) a yarn fabric made of at least one of i) a yarn comprising cotton and synthetic fibers and ii) a twisted yarn comprising cotton and synthetic fibers.

6. The power transmission belt according to claim 2 wherein the synthetic fiber comprises at least one of a) a polyester that is at least one of polyethylene terephthalate and polyethylene naphthalate, b) nylon, c) aramid, and d) vinylon.

7. The power transmission belt according to claim 2 wherein the canvas layer is made up of only the cotton fibers and the synthetic fibers.

8. The power transmission belt according to claim 2 wherein there are load carrying cords embedded in the body and extending, lengthwise of the body.

9. The power transmission belt according to claim 1 wherein the center lines of the warp and weft yarns cross at an angle of 90±10°.

10. A power transmission belt comprising:
    a body having a length, an inside surface, an outside surface, and at least one rib on the inside surface of the body; and
    an untentered canvas layer on the outside surface of the body,
    said canvas layer comprising a plain weave canvas comprising cotton fiber and synthetic fiber.

11. The power transmission belt according to claim 10 wherein the canvas layer comprises warp and weft yarns each with center lines which cross to be biased with respect to the length of the body.

12. The power transmission belt according to claim 11 wherein the warp and weft yarns are present in an amount of at least 10/10 mm.

13. The power transmission belt according to claim 12 wherein the warp and weft yarns each have a tensile strength of at least 14 N/yarn.

14. The power transmission belt according to claim 11 wherein the warp and weft yarns comprise at least one of a) a yarn comprising cotton and synthetic fibers, b) a twisted yarn comprising cotton and synthetic fibers, and c) a yarn fabric made of at least one of i) a yarn comprising cotton and synthetic fibers and ii) a twisted yarn comprising cotton and synthetic fibers.

15. The power transmission belt according to claim 11 wherein the center lines of the warp and weft yarns cross at an angle of 90±10°.

16. The power transmission belt according to claim 10 wherein the power transmission belt is a V-ribbed belt with there being a plurality of ribs formed on the inside surface of the belt body.

17. The power transmission belt according to claim 10 wherein the synthetic fiber comprises at least one of a) a polyester that is at least one of polyethylene terephthalate and polyethylene naphthalate, b) nylon, c) aramid, and d) vinylon.

18. A power transmission belt comprising:
- a body having a length, an inside surface, an outside surface, and at least one rib on the inside surface of the body; and
- an untentered canvas layer on the outside surface of the body,
- said canvas layer comprising a plain weave canvas comprising warp and weft yarns.

19. The power transmission belt according to claim 18 wherein the power transmission belt is a V-ribbed belt with there being a plurality of ribs formed on the inside surface of the belt body.

20. The power transmission belt according to claim 19 wherein the warp and weft yarns are present in an amount of at least 10/10 mm.

21. The power transmission belt according to claim 20 wherein the warp and weft yarns each have a tensile strength of at least 14 N/yarn.

22. The power transmission belt according to claim 18 wherein the warp and weft yarns comprise at least one of a) a yarn comprising cotton and synthetic fibers, b) a twisted yarn comprising cotton and synthetic fibers, and c) a yarn fabric made of at least one of i) a yarn comprising cotton and synthetic fibers and ii) a twisted yarn comprising cotton and synthetic fibers.

23. The power transmission belt according to claim 18 wherein the synthetic fiber comprises at least one of a) a polyester that is at least one of polyethylene terephthalate and polyethylene naphthalate, b) nylon, c) aramid, and d) vinylon.

24. The power transmission belt according to claim 18 wherein the warp and weft yarn have center lines that cross at an angle of 90±10°.

* * * * *